United States Patent
Chauhan et al.

(10) Patent No.: US 9,080,092 B2
(45) Date of Patent: *Jul. 14, 2015

(54) COMPOSITIONS FOR DEICING/ANTI-ICING

(71) Applicant: Battelle Memorial Institute, Columbus, OH (US)

(72) Inventors: Satya P. Chauhan, Columbus, OH (US); Melissa S. Roshon, Hilliard, OH (US); William D. Samuels, Richland, WA (US)

(73) Assignee: Battelle Memorial Institute, Columbus, OH (US)

(*) Notice: Subject to any disclaimer, the term of this patent is extended or adjusted under 35 U.S.C. 154(b) by 72 days.

This patent is subject to a terminal disclaimer.

(21) Appl. No.: 14/025,261

(22) Filed: Sep. 12, 2013

(65) Prior Publication Data

US 2014/0042357 A1     Feb. 13, 2014

Related U.S. Application Data

(63) Continuation-in-part of application No. 13/578,924, filed as application No. PCT/US2011/025253 on Feb. 17, 2011, now Pat. No. 8,562,854.

(60) Provisional application No. 61/305,312, filed on Feb. 17, 2010.

(51) Int. Cl.
C09K 3/18 (2006.01)

(52) U.S. Cl.
CPC .. *C09K 3/185* (2013.01); *C09K 3/18* (2013.01)

(58) Field of Classification Search
CPC ................................. C09K 3/18; C09K 3/185
USPC ............................................. 106/13; 252/70
See application file for complete search history.

(56) References Cited

U.S. PATENT DOCUMENTS

| | | | |
|---|---|---|---|
| 3,838,992 A | 10/1974 | Rosenwald | |
| 4,210,549 A | 7/1980 | Hirozawa et al. | |
| 4,358,389 A | 11/1982 | Konig-Lumer et al. | |
| 4,388,203 A | 6/1983 | Nimerick et al. | |
| 4,455,248 A | 6/1984 | Wood | |
| 4,585,571 A | 4/1986 | Bloom | |
| 4,746,449 A | 5/1988 | Peel | |
| 4,954,279 A | 9/1990 | Ma et al. | |
| 5,268,117 A | 12/1993 | Fusiak et al. | |
| 5,273,673 A | 12/1993 | Ashrawi et al. | |
| 5,386,968 A | 2/1995 | Coffey et al. | |
| 5,674,428 A | 10/1997 | Lott et al. | |
| 5,681,882 A | 10/1997 | Jenkins et al. | |
| 5,708,068 A | 1/1998 | Carder et al. | |
| 5,750,047 A | 5/1998 | Lemma | |
| 5,759,439 A | 6/1998 | Kott et al. | |
| 5,772,912 A | 6/1998 | Lockyer et al. | |
| 5,817,252 A | 10/1998 | Hu et al. | |
| 5,876,621 A | 3/1999 | Sapienza | |
| 5,968,407 A | 10/1999 | Boluk et al. | |
| 5,980,774 A | 11/1999 | Sapienza | |
| 5,993,684 A | 11/1999 | Back et al. | |
| 6,080,331 A | 6/2000 | Meszaros et al. | |
| 6,129,857 A | 10/2000 | Sapienza | |
| 6,149,834 A | 11/2000 | Gall et al. | |
| 6,294,104 B1 | 9/2001 | Ilves et al. | |
| 6,299,793 B1 | 10/2001 | Hartley et al. | |
| 6,315,919 B1 | 11/2001 | Sapienza | |
| 6,391,224 B1 | 5/2002 | Wowk | |
| 6,436,310 B1 | 8/2002 | Hartley et al. | |
| 6,440,325 B1 | 8/2002 | Hartley et al. | |
| 6,596,189 B1 | 7/2003 | Moles et al. | |
| 7,105,105 B2 | 9/2006 | Samuels et al. | |
| 7,169,321 B2 | 1/2007 | Simmons et al. | |
| 7,270,767 B1 | 9/2007 | Westmark et al. | |
| 7,972,530 B2 | 7/2011 | Wehner et al. | |
| 2002/0063236 A1 | 5/2002 | Sapienza | |
| 2005/0087720 A1 | 4/2005 | Samuels et al. | |
| 2007/0200087 A1 | 8/2007 | Wehner et al. | |
| 2012/0305831 A1 | 12/2012 | Chauhan et al. | |

FOREIGN PATENT DOCUMENTS

| | | |
|---|---|---|
| CN | 1138080 A | 12/1996 |
| EP | 0352120 A2 | 1/1990 |
| EP | 0257720 B1 | 4/1991 |
| EP | 0555002 A1 | 8/1993 |
| EP | 0646634 B1 | 8/1998 |
| EP | 0860490 A1 | 8/1998 |
| EP | 0864626 A1 | 9/1998 |
| EP | 1333081 A2 | 8/2003 |
| GB | 559172 A | 2/1944 |

(Continued)

OTHER PUBLICATIONS

Christoph, et al., "Glycerol", Ullmann's Encyclopedia of Industrial Chemistry, 2012, vol. 17, pp. 67-82.
"Glycerol", Kirk-Othmer Encyclopedia of Chemical Technology, pp. 1-13.
Fluka, "Fluka Chemika-BioChemika", 1993, p. HFL 1096.
Lock, et al., "Sorbic Acid", Ullmann's Encyclopedia of Industrial Chemistry, 2012, vol. 33, pp. 715-723.
Material Safety Data Sheet, "BRIJ 35 MSDS", created Oct. 2005, updated Nov. 2010, pp. 1-5.
Material Safety Data Sheet, "Glycerin MSDS", created Oct. 2005, updated Nov. 2010, pp. 1-6.
Material Safety Data Sheet, "Propylene glycol MSDS", created Oct. 2005, updated Nov. 2010, pp. 1-6.

(Continued)

*Primary Examiner* — Anthony J Green
(74) *Attorney, Agent, or Firm* — MacMillan, Sobanski & Todd, LLC

(57) ABSTRACT

A non-toxic deicing/anti-icing fluid includes at least 20% by weight of a freeze point depressant selected from short chain polyols having 3 to 5 carbon atoms. The fluid further includes at least 10% by weight of water, a thickener, a surfactant, and a pH moderator. The fluid meets the requirements of SAE/AMS 1428 or its revisions for a non-Newtonian, Type II, III, or IV aircraft deicing/anti-icing fluid.

32 Claims, 4 Drawing Sheets

(56) References Cited

FOREIGN PATENT DOCUMENTS

| | | |
|---|---|---|
| GB | 1272464 A | 4/1972 |
| JP | Sho 5476489 | 6/1979 |
| JP | 57167375 A | 10/1982 |
| JP | 62201566 A | 9/1987 |
| RU | 2142491 C1 | 12/1999 |
| RU | 2186818 C1 | 8/2002 |
| SU | 1101444 A1 | 7/1984 |
| WO | 8704450 A1 | 7/1987 |
| WO | 9110361 A1 | 7/1991 |
| WO | 9623043 A1 | 8/1996 |
| WO | 0000568 A1 | 1/2000 |
| WO | 0129146 A1 | 4/2001 |
| WO | 0146334 A1 | 6/2001 |
| WO | 2004039910 A2 | 5/2004 |
| WO | 2005042662 A1 | 5/2005 |
| WO | 2005105945 A2 | 11/2005 |

OTHER PUBLICATIONS

Material Safety Data Sheet, "Sodium tetraborate decahydrate MSDS" Fisher Scientific Canada, created Jul. 1999, updated Mar. 2004, pp. 1-7.
"Fish, Acute Toxicity Test", OECD Guideline for Testing of Chemicals, 1992, pp. 1-9.
Rompp, "Antioxidantien", 1979, p. 242.
"(R) Standard Test Method for Aerodynamic Acceptance of SAE AMS 1424 and SAE AMS 1428 Aircraft Deicing/Anti-icing Fluids" AS5900 Revision B, Aerospace Standard, SAE Aerospace, Issued Feb. 2003, Revised Jul. 2007, pp. 1-28.
Schubert, "Boron Oxides Boric Acid, and Borates", Kirk-Othmer Encyclopedia of Chemical Technology, 2011, p. 50.
PCT International Search Report and Written Opinion, Application No. PCT/US2014/055305 dated Dec. 17, 2014.

COMPOSITIONS FOR DEICING/ANTI-ICING

CROSS-REFERENCE TO RELATED APPLICATION

This application is a continuation-in-part patent application of U.S. patent application Ser. No. 13/578,924, filed Aug. 14, 2012, which issued as U.S. Pat. No. 8,562,854 on Oct. 22, 2013, which is a 371 of PCT/US2011/025253 filed Feb. 17, 2011, which claims the benefit of U.S. Provisional Application No. 61/305,312, filed Feb. 17, 2010, the disclosures of which are incorporated herein by reference.

BACKGROUND OF THE INVENTION

This invention relates in general to improved, thickened, fluid compositions to remove ice, frost, and snow from surfaces and/or to prevent ice from forming on surfaces. More specifically, in certain embodiments, this invention relates to formulation of environmentally-friendly, non-Newtonian fluids, primarily for aircraft deicing/anti-icing, as required per Society of Automotive Engineers Aerospace Material Specification (SAE/AMS) 1428. However, other applications of deicing/anti-icing, such as wind-turbine blades and third-rail where the rail is for making electrical contact, are also possible.

Several types of aircraft deicing/anti-icing fluids (ADFs/AAFs) are used to remove deposits of ice, frost and snow from aerodynamically-critical surfaces before an aircraft can safely lift off the runway. Additionally, the film of such a liquid, left on the aircraft, provides some protection from refreezing of water due to freezing precipitation. The anti-icing property of these fluids can be quantified by the Water Spray Endurance Test (WSET), which is fully described in SAE/AMS 1428 Specification. Four different types of ADF/AAFs, namely Types I, II, III, or IV, can be qualified for use on an aircraft, depending on how the fluid is used and the anti-icing protection achieved. The anti-icing protection requirement for Type I fluids is only 3 minutes, with Types II and IV being 30 and 80 minutes, respectively. To achieve the much longer WSET times for Types II and IV fluids, the fluids are thickened and these exhibit non-Newtonian (pseudoplastic) behaviors, also referred to as shear-thinning behavior. The shear thinning behavior allows for maximum anti-icing protection due to the uniform coverage by a high viscosity fluid when the aircraft is stationary (zero shear). This fluid greatly thins out during an aircraft take-off roll as the shear rate rapidly increases, which allows the aircraft to shed the majority of the fluid, thus restoring the aerodynamics of the airfoil.

The primary difference between Type II and Type IV fluids is that a Type II can be used both for deicing and anti-icing while Type IV is used just for anti-icing after a deicing step is completed. In either case, such fluids typically contain a mixture of a glycol, such as ethylene glycol (EG) or diethylene glycol (DEG) or propylene glycol (PG) with water, the glycol plus water typically adding up to more than 95% by weight (wt %). These fluids also contain additives such as thickeners, surfactants, anti-foamers, corrosion inhibitors, anti-precipitants, and dyes to meet the specifications. All of these chemicals are of potential concern to airports as they are required to obtain storm water discharge permits under the applicable environmental protection agencies. The concerns are: (a) high levels of oxygen demand due to natural biodegradation of glycols; (b) mammalian toxicity of some glycols, such as EG (which is also a hazardous air pollutant) and DEG; (c) toxicity of degradation products of commonly-used surfactants; (d) toxicity and non-biodegradability of commonly used corrosion inhibitors and other additives.

The vast majority of Type II and IV fluids use PG as a freeze-point depressant but it has a high chemical oxygen demand (COD) and biological oxygen demand (BOD). The thickened fluids typically use alkylphenol ethoxylate (APE) surfactants, the biodegradation products of which have been shown to be endocrine disruptors, and as such these are banned in Europe and are under EPA scrutiny in the U.S. A number of fluids also use benzyltriazole or tolytriazole corrosion inhibitors, which are toxic and non-biodegradable and thus persist in the environment.

The thickened fluids of prior art typically use large molecules (polymers) that typically thicken by molecular entanglement or gelation due to pH adjustment. These polymers often have performance deficiencies as they leave gel-forming residues on aircraft surfaces. The quantity of residue is typically proportional to the amount of thickener (polymer) used as that is the primary controller of viscosity and rheology. Additionally, these thickeners typically have relatively flat viscosity vs. temperature curve in the 20° C. to −30° C. range. If a certain, high viscosity is targeted for the 0 to −10° C., which is the majority of operating range, one gets undesirably high viscosities at 20° C. which makes fluid preparation and handling harder as well as at temperature below −10° C. which makes aerodynamic performance poorer and the gel residue problem worse.

Various patents are known that describe some of the approaches, partial solutions, and inherent problems for addressing the requirements for aircraft anti-icing. However, the thickened aircraft fluids described in the patents have functional and/or environmental deficiencies. The functionally superior formulations rely on use of components that were recently recognized as environmentally unfriendly and are in various phases of being banned. A high performance, environmentally friendly, thickened aircraft fluid is therefore desired. Such fluids may also be useful for other applications, such as (a) deicing/anti-icing of wind-turbine blades and (b) stationary surfaces such as the third rail for electric trains.

SUMMARY OF THE INVENTION

This invention relates to improved compositions for deicing/anti-icing. In certain embodiments, the composition is an environmentally-friendly deicing/anti-icing fluid, which includes short chain polyols having 3 to 5 carbon atoms, and mixtures thereof, a thickener, nonionic surfactant(s), and other additives, which is functionally superior to prior-art fluids with respect to its anti-icing properties. This fluid in certain embodiments is non-toxic to mammalians and can typically have at least a 25 lower aquatic toxicity.

Also, in certain embodiments, the deicing/anti-icing fluids meet or exceed the requirements of SAE/AMS 1428, especially Type IV anti-icing fluids with a freeze point below −32° C. and a WSET of over 80 minutes in an undiluted form. The fluids may also be used as a Type II fluid for deicing and anti-icing with a WSET above 30 minutes for undiluted fluid.

In certain embodiments, the compositions include bio-based $C_3$-$C_5$ polyols, such as PG, glycerol, and xylitol, to substantially reduce the carbon footprint of the fluid.

In certain particular embodiments, the compositions eliminate the use of toxic surfactants such as alkylphenol ethoxylates (APEs) and/or toxic corrosion inhibitors such as triazoles (e.g., benzyltriazoles) used in prior-art fluids, thus lowering the aquatic toxicity with $LC_{50}$ (lethal concentration above which 50% of species such as fathead minnows or daphnia magna die, at conditions described in AMS 1428) values of at least 1,000 mg/L (the higher the value, the lower the toxicity).

In other embodiments, the compositions include associative polymers, such as cross-linked polyacrylic acid copolymers, in combination with non-APE surfactants that strongly associate (interact) with the polymers to achieve desired thickening at freezing temperatures with substantially reduced polymer usage, and thus improved preparation and handling of the fluid due to a lower viscosity at warmer temperatures.

In certain embodiments, the compositions include mixtures of glycerol and other petroleum-based or bio-based $C_3$-$C_5$ polyols to reduce the COD/BOD of the fluid as well as to achieve desired thickening with a reduced quantity of thickener, which minimizes the formation of gel-forming residues on aircraft surfaces.

In other embodiments, the compositions include environmentally friendly anti-precipitants or chelating agents to give protection from hardness ions, such as calcium, if the fluid is to be diluted, while reducing the requirement for corrosion inhibitors and thus reduce the toxicity of the fluid.

Also, in certain embodiments, the compositions include non-foaming or low-foaming, nonionic surfactants that associate with the polymeric thickener to reduce or eliminate the use of anti-foamers, further reducing the toxicity of the fluid.

Various additional aspects of the compositions will become apparent to those skilled in the art from the following detailed description of the preferred embodiments and the accompanying drawings.

DETAILED DESCRIPTION OF THE PREFERRED EMBODIMENTS

As previously mentioned, a fluid with strong anti-icing properties meeting the specifications in SAE/AMS 1428 may contain a freeze point depressant (FPD), water, a thickener, and a surfactant. Other additives to manage dilution by hard water, foaming on spraying, inhibit corrosion, and to give the required color to the formulation, may be added. All ingredients except water can potentially degrade the environment on discharges after application. We have discovered compositions that, in certain embodiments, eliminate the toxic components while maintaining or exceeding the functional requirements of aircraft deicing/anti-icing. The paragraphs 26 and 27 may be best described after paragraph 20 or 21 as all viscosity discussions, including the drawings in paragraphs 17-20 are based on this methodology.

Figure 1:
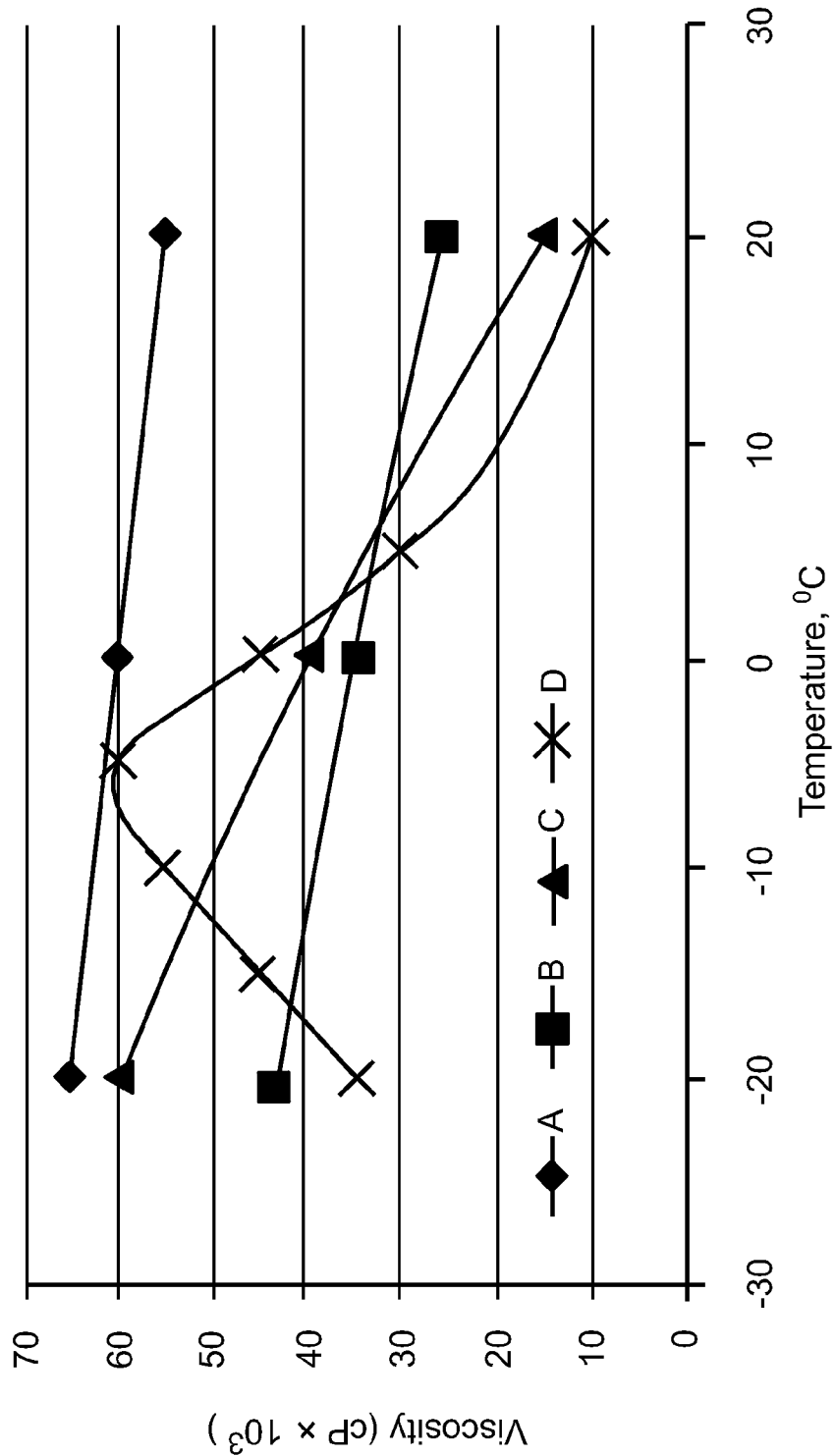
FIG. 1 is a plot showing viscosity at different temperatures of anti-icing fluids.

The viscosity, rheology, and surface activity of an anti-icing formulation are significant for achieving anti-icing properties. A typical prior-art, anti-icing fluid uses a shear thinning thickener, so as to easily shed off an aircraft on takeoff due to application of shear, which produces a relatively flat viscosity curve on chilling, as shown in FIG. 1. The curves (A) and (B) are based on use of natural thickener, xanthan gum (Ref.: U.S. Pat. No. 5,772,912). As shown, up to about 0.5% thickener is needed to reach a viscosity of 60,000 cP at −5° C., but this makes the 20° C. viscosity about 55,000 cP, which is thick for fluid preparation and handling. Also, a viscosity of 65,000 cP at −20° C. is unlikely to pass aerodynamic acceptance test. Curves (C) and (D) are examples of formulations we have made that show rapid viscosity rise on chilling from 20° C. down to freezing temperature, using only about 0.2% or less thickener and especially, non-APE associating surfactants. Among these two latter curves, the formulation (D) is more attractive as it shows a decline in viscosity after about −5° C. to −10° C., which allows the fluid to have excellent anti-icing behavior while not being too thick to pass aerodynamic acceptance test (SAE/AMS 1428) at temperatures below −20° C. Rapidly rising and then falling viscosity on chilling is desired over flat curves in some applications. As described in more detail below, these special effects on viscosity are in some embodiments based on using special surfactants and potentially a special FPD blend. In some embodiments, these viscosity properties are provided by the interaction between surfactant(s) and polymeric thickener(s).

In certain embodiments, the fluid has a viscosity of 20,000 cP or less at 20° C. and 0.06 sec−1 shear rate, and in more particular embodiments the viscosity is 15,000 cP or less at 20° C. and 0.06 sec−1, and most particularly 10,000 cP or less. In certain embodiments, the fluid has this viscosity while also meeting the WSET requirement for Type IV fluids of AMS 1428 (anti-icing protection time, i.e., WSET, of 80 minutes or more).

Also, in certain embodiments, the viscosity at −5° C. (measured at 0.06 sec−1 shear rate) is 3 to 10 times (preferably 4 to 8 times) higher than the viscosity at 20° C.

Further, in certain embodiments, the viscosity of the fluid begins to decline after cooling below about −5° C. The inclusion of an inorganic base and an appropriate combination of a thickener and surfactant in the fluid to raise the pH can help to achieve this property. To assure that the viscosity at operating temperatures (below 0° C.) is not too high, the viscosity at 20° C. may be decreased by including a viscosity control additive in the fluid, for example a carboxylic acid salt.

Viscosity versus temperature. A viscosity versus temperature curve (referred to as a continuous-chill curve) is obtained to determine a fluid's rheological behavior, and thus judge its anti-icing and aerodynamic acceptance properties. A chill curve measures the viscosity of the fluid at a given shear rate and at various temperatures, while the sample is being chilled. In this manner, viscosity at more than about 20 temperatures can be measured in about an hour.

A Brookfield LVII+ Pro™ equipped with WinGather software is used to perform viscosity measurements. Calculations are based on a spindle that rotates in a pool of fluid at a given velocity (RPM), which correlates with a shear rate (sec$^{-1}$). Chill curves at 0.3 RPM (0.06 sec$^{-1}$ shear rate) can be related to the WSET (anti-icing) requirements in AMS 1428 and is representative of a "still" aircraft. The viscometer measures the stress on the rotating spindle and thus calculates the viscosity. Various size spindles are provided by Brookfield for use with different range of viscosities. This type of viscometer is prescribed in AMS 1428, although the specification only calls for measurements at three shear rates and discrete temperature values. The samples are chilled using a Kinetics Thermal System™ immersion chiller equipped with a flexible probe that chills a methanol bath down to desired temperature.

In certain embodiments, the present compositions are useful as an environmentally friendly and functionally superior deicer/anti-icer, primarily for use on aircrafts, that contains a mixture of $C_3$-$C_5$ polyols and water, the total weight of which is about 95-99%. Some examples of FPDs are glycerol; 1, 2 propanediol (a $C_3$ polyol, commonly referred to as propylene glycol (PG)); 1, 3 propanediol ($C_3$, PDO); DEG ($C_4$); erythritol; and xylitol ($C_5$), among others. The COD of PG, which is the most widely used FPD in Type II and IV fluids, is 1.68 kg $O_2$/kg fluid. The COD values of glycerol and xylitol, on the other hand, are 1.22 and 1.16 kg $O_2$/kg respectively. Therefore, glycerol and xylitol are preferred for lower-COD fluids. In certain embodiments, to optimize certain physical properties, these are used in combination with other $C_3$-$C_5$ polyols. The relative proportions of the FPD and water can be varied to obtain a freeze point below −32° C. The FPDs can be biobased (e.g., derived from plants) or non-biobased (e.g., derived from petroleum or other materials).

In certain embodiments, the fluid composition includes a thickener which associates with surfactant(s) and some FPDs to achieve optimum viscosity and rheology, allowing viscosity at temperature of formulation to be low, viscosity at typical operating temperatures to be high enough to obtain a high WSET value, and providing a medium viscosity at very low temperatures. This thickener-surfactant association may provide a synergistic effect on thickening, thereby reducing the amount of thickener needed. The associative polymers are water-soluble. Examples of thickeners are synthetic polymers of carboxylic acid group, such as polyacrylic acid (PAA). The polymers may be lightly cross-linked (co-polymerized) with hydrophobic monomers/macromonomers to allow association with hydrophobic portions of surfactants. The typical concentration of the polymers thickener is 50 ppm to 0.5 wt %, preferably 0.1 to 0.2 wt %. These polymers are typically partially neutralized with an alkali such as potassium or sodium hydroxides or an alkylamine, to achieve a pH value of 6.5 to 8.5, with a preferred value being 6.9 to 7.5. A particular alkali is potassium hydroxide. Other thickeners could also be useful.

In some particular embodiments, the associative thickener is a cross-linked polyacrylic acid. In other particular embodiments, the associative thickener is a co-polymer of acrylic acid and $C_{10}$-$C_{30}$ alkyl acrylate, cross-linked.

In certain embodiments, the surfactant has a synergistic effect on thickening, thereby reducing the amount of thickener needed. For example, in certain embodiments, the fluid may contain 0.20% or less thickener by weight of the fluid. This allows one to minimize the formation of gel forming potential (GFP, measured by a method described in AMS 1428). For example, the fluids made by the certain embodiments of this invention have a GFP value of no more than about 2.5, while the AMS specification is to be no higher than 4.

In certain embodiments, the compositions are useful as aircraft anti-icing fluids (AAF's). These fluids can be more difficult to formulate than aircraft deicing fluids (ADF's).

The rheology of an AAF or ADF can depend on several ingredients that are used for functions other than thickening: surfactant for improved wetting, alkali for pH modification, the freezing point depressant(s), and chelating agent for anti-precipitation.

In certain embodiments, fluid composition includes one or more non-ionic surfactants to not only provide for a reduction in the surface tension of the FPD to obtain uniform coverage of the aircraft surfaces, but to also enhance the thickening effect of the polymeric thickener. While a wide variety of nonionic surfactants are available, many are unsuitable due to toxicity, lack of biodegradability, and functional performance reasons. As mentioned earlier, unlike a majority of the prior-art formulations, APEs, which are functionally excellent, are to be excluded in certain embodiments. In other embodiments, surfactants that fall out of the formulation at any temperature on dilution are excluded. Typically useful surfactants are alkoxylated branched alcohol and alkoxylated linear or secondary alcohols, with branched alcohols being preferred. These surfactants can have an association with the thickener as described above. These surfactants typically have a formula, $CH_3C_nH_{2n}O(C_2H_4O)_yH$, which can be simplified as $C_{n+1}H_{2n+3}O(EO)_yH$. The surfactants of use typically have "n" values ranging from about 6 to 18 and "y" values ranging from about 2 to 20. The hydrophilic lipophilic balance (HLB) values of these surfactants typically vary from about 6 to 18. The surfactant(s) are to be selected to balance their hydrophobic character, as represented by the hydrocarbon ($C_{n+1}H_{2n+3}$) chain and the hydrophilic character, as represented by the ethylene oxide ($C_2H_4O$) or EO units. The preferred values of "n", "y", and HLB are 8-14, 3-12, and 6-12, respectively. In some compositions, non-foaming or low-foaming surfactants are used, for example, surfactants having an HLB less than 10. Other types of surfactants could also be useful.

In some particular embodiments, the associative surfactant is an alcohol ethoxylate, and more specifically it may be a linear alcohol ethoxylate. For example, the surfactant may be an alcohol ethoxylate having the structural formula Cn+1H2n+3(EO)yH where n=6-18 and y=3-12. In more particular embodiments, n=10-13 and y=4-8. The alkyl phenol ethoxylates are not included. The associated surfactant may be oil-soluble, nonionic, and readily biodegradable.

Figure 2:
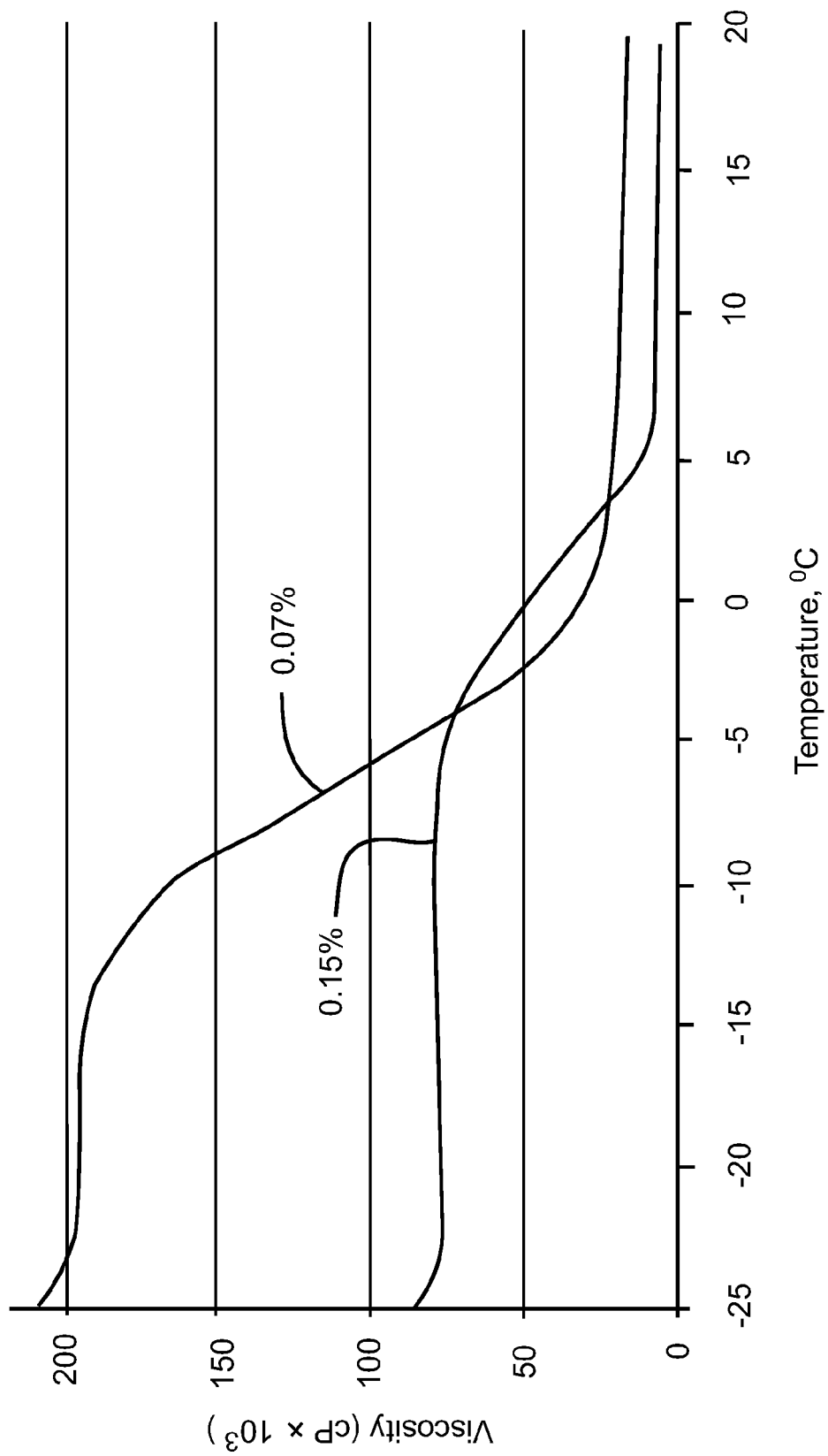
FIG. 2 is a plot showing the effect of associating anti-precipitant concentration on viscosity at different temperatures of deicing/anti-icing fluids.

In certain embodiments, the fluid composition includes an anti-precipitant to manage dilution with water containing hardness ions. A variety of chelating agents, such as EDTA (ethylenediaminetetraacetic acid) or HEDTA (hydroxyethylethylenediaminetriacetic acid) or their salts are used in prior art. However, EDTA or HEDTA cause excessive corrosion of certain aircraft components, which leads to the requirement of corrosion inhibitors, and which are typically toxic; these are also inadequately biodegradable. Therefore, in certain embodiments, non-EDTA, non-HEDTA chelating agents, such as polymeric dispersants or aminopoly-carboxylates are used. The preferred anti-precipitant helps control the viscosity of the fluid as well, as shown in FIG. 2.

In some particular embodiments, the anti-precipitant is a biodegradable chelating agent. Some examples are glutamic acid, N,N-diacetic acid, and tetra sodium salt. The fluid does not include EDTA or HEDTA or their salts.

In certain embodiments, the fluid includes a viscosity control agent or thinner to decrease the viscosity of the fluid. In some particular embodiments, the viscosity control agent is a sodium/potassium carboxylate. For example, it may have the structural formula Na/K ($C_xO_yH_z$) where x=2-7, y=2-3 and z=5. Some particular examples are sodium lactate and sodium benzoate. For example, the inclusion of the viscosity control agent may decrease the viscosity of the fluid by at least 1000 cP at 20° C.

Figure 3:
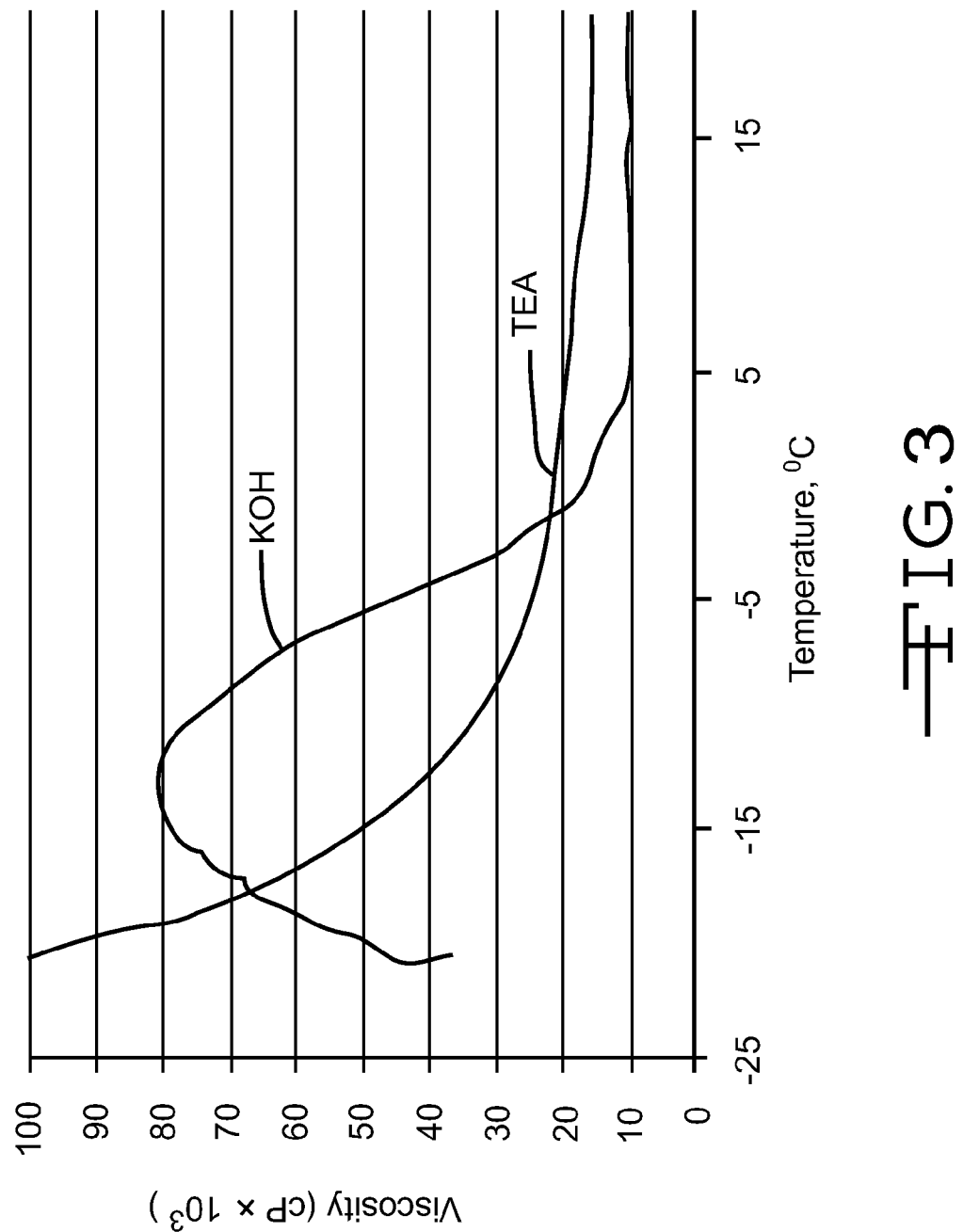
FIG. 3 is a plot showing the effect of a pH modifier on viscosity at different temperatures of deicing/anti-icing fluids.

The compositions may also include a pH moderator, which can be any material(s) suitable for modifying or maintaining the pH of the composition within a certain range. Some non-limiting examples include basic materials, such as inorganic bases (e.g., alkali metal hydroxides such as potassium hydroxide or sodium hydroxide), or organic bases (e.g., mono-, di-, or tri-ethanolamine). In some particular embodiments, the pH moderator is an inorganic base. The pH modification can have an effect on the rheology of the fluid as shown in FIG. 3. For example, the inclusion of an inorganic base can help to prevent the viscosity of the fluid from being too high at operating temperatures, e.g., a viscosity of over 100,000 cP at −5 C and 0.06 sec−1 shear rate.

The fluid may include a defoamer if one or more of the surfactants have a high HLB value. Also, a food grade dye may be added to meet specifications.

Figure 4:
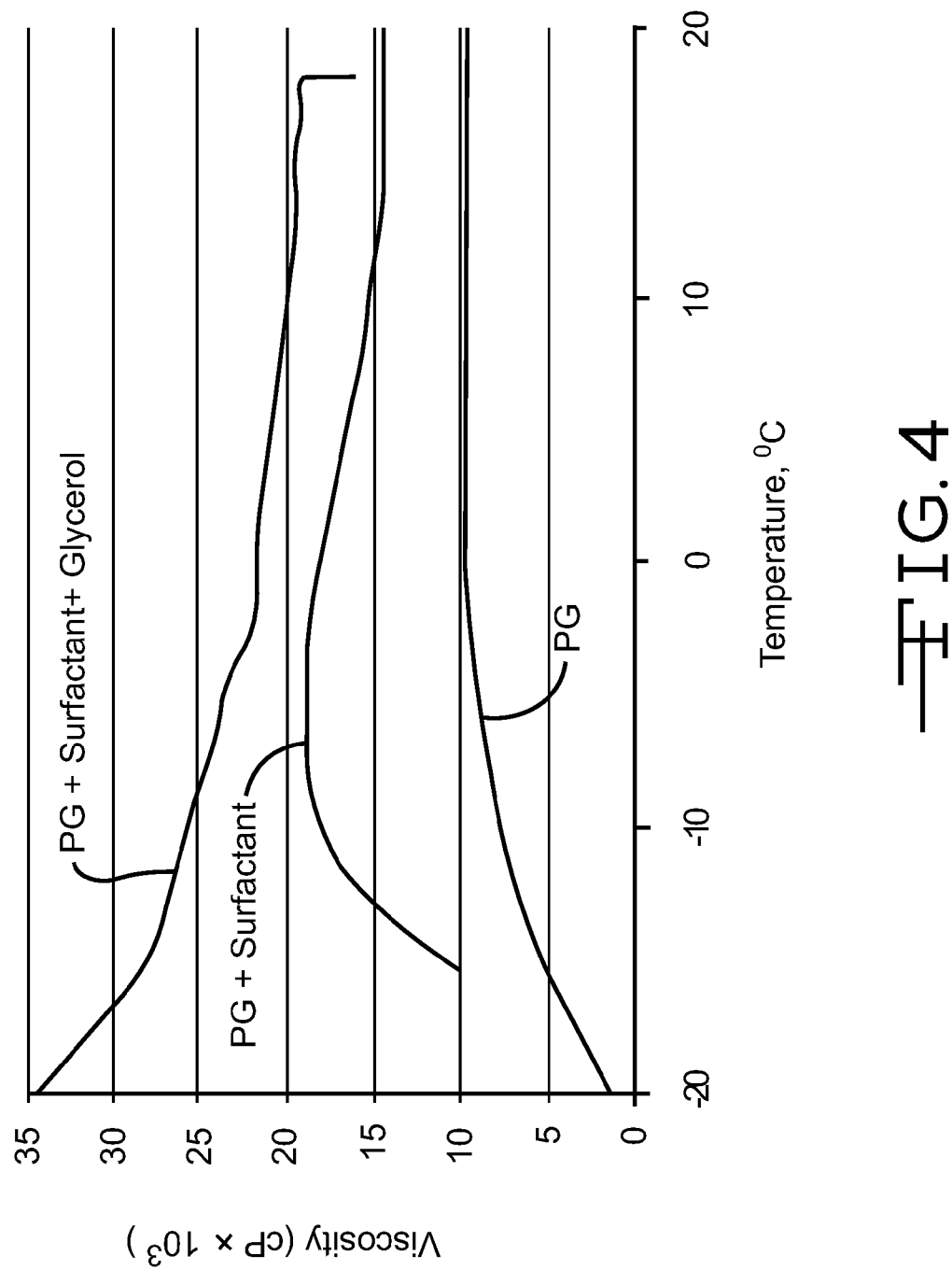
FIG. 4 is a plot showing the effect of associating surfactant and glycerol on viscosity at different temperatures of deicing/anti-icing fluids.

An unexpected observation was the beneficial thickening effect of glycerol when combined with a thickener and surfactant. For example, on substituting PG with some glycerol, not only did the COD of the fluid decline, but also the amount of polymer and surfactant needed to achieve the viscosity behavior decreased. This is illustrated in FIG. 4. The baseline (lowest viscosity) curve is for the case where no surfactant is added along with the thickening polymer and the freeze point depressant is PG. When an associating surfactant is added, the viscosity increases significantly. Further, when a surfactant is added and some PG is substituted by glycerol, the viscosity increases substantially. In certain embodiments, this synergy of effect allows one to make the fluid more environmentally friendly and also to reduce the formation of gel-foaming residues on aircraft surfaces. A similar synergistic effect may also be found with mixtures of glycerol and other petroleum or bio-based $C_3$-$C_5$ polyols (e.g., PG, PDO and/or xylitol).

In certain embodiments, the compositions include a non-triazole compound to serve as a corrosion inhibitor, if needed to meet the materials compatibility specifications for aluminum, steel, and cadmium. This excludes triazole compounds such as benzotriazole and tolytriazole. Examples of less toxic corrosion inhibitors are: carboxylates, silicates, phosphonates, sulfonates, amines, and amides.

In some particular embodiments, the corrosion inhibitor is a potassium salt of silicic acid. For example, it may have a weight ratio of $SiO_2$:$K_2O$ of about 2.5. In other particular embodiments, the corrosion inhibitor is a sodium carboxylate or potassium carboxylate.

Also, in certain embodiments, a deicing/anti-icing formulation is provided based on $C_3$-$C_5$ polyols which is partly or entirely bio-based, thus reducing the carbon footprint of the fluid. Examples of bio-based polyols of this invention are glycerol, PG, PDO, and xylitol, all of which have been successfully utilized in our formulations.

The use of multi-function components in the compositions can minimize the number of additives used in the compositions, thereby improving the environmental friendliness of the compositions by reducing corrosivity and toxicity. For example, in certain embodiments, the compositions contain the following components: freezing point depressant(s), thickener(s), surfactant(s), pH moderator(s) and water.

The following Tables 1 and 2 show some examples of deicing/anti-icing fluids of this invention.

TABLE 1

Examples of Compositions of Deicing/Anti-Icing Fluids

| Component Composition | Wt % Range | Wt % Preferred for Type IV Fluid |
|---|---|---|
| C3-C5 Polyol | 20-90 | 45-65 |
| Non-NPE Nonionic Surfactant #1 | 0.003-0.40 | 0.05-0.20 |
| Non-NPE Nonionic Surfactant #2 | 0.002-0.20 | 0.01-0.10 |
| Water | 10-80 | 35-45 |
| Polycarboxylic Acid Thickener | 0.005-0.50 | 0.05-0.20 |
| Potassium Hydroxide | To achieve pH of 6.5 to 8.5 | To achieve pH of 6.9 to 7.5 |
| Chelating Agent | 0.005-0.50 | 0.03-0.20 |
| Antifoamer | 0-0.20 | 0.05-0.10 |
| Non-triazole Corrosion Inhibitor | 0-0.50 | 0.01-0.20 |

TABLE 2

Further Examples of Compositions of Deicing/Anti-Icing Fluids

| Propylene Glycol | 20 | 85 | 50 | 50 | 30 | 0 | 0 | 0 | 0 |
|---|---|---|---|---|---|---|---|---|---|
| Glycerol | 0 | 0 | 0 | 0 | 30 | 0 | 30 | 40 | 0 |
| PDO | 0 | 0 | 0 | 0 | 0 | 50 | 30 | 0 | 30 |
| Xylitol | 0 | 0 | 0 | 0 | 0 | 0 | 0 | 20 | 30 |
| Non-NPE Nonionic Surfactant #1 | 0.025 | 0.10 | 0.20 | 0.14 | 0.20 | 0.40 | 0.15 | 0.25 | 0.30 |
| Non-NPE Nonionic Surfactant #2 | 0.005 | 0.05 | 0.10 | 0 | 0.03 | 0.002 | 0.01 | 0.05 | 0.06 |
| Water (Balance) | ~79.5 | ~14.5 | ~49.0 | ~49.5 | ~39.0 | ~51.0 | ~39.5 | ~39.0 | ~39.0 |
| Polycarboxylic Acid Thickener | 0.03 | 0.15 | 0.30 | 0.14 | 0.23 | 0.40 | 0.15 | 0.30 | 0.35 |
| Potassium Hydroxide (pH) | (6.8) | (7.0) | (8.5) | (7.2) | (7.5) | (7.2) | (7.5) | (7.3) | (7.2) |
| Chelating Agent | 0.025 | 0.05 | 0.10 | 0.08 | 0.20 | 0.10 | 0.05 | 0.05 | 0.10 |
| Antifoamer | 0.20 | 0 | 0.10 | 0 | 0.05 | 0.05 | 0.10 | 0 | 0 |
| Non-triazole Corrosion Inhibitor | 0 | 0 | 0.20 | 0.08 | 0.10 | 0.10 | 0.05 | 0.20 | 0.10 |

The invention claimed is:

1. A non-toxic deicing/anti-icing fluid comprising:
   at least about 20% by weight of a freeze point depressant selected from the group consisting of short chain polyols having 3 to 5 carbon atoms, and mixtures thereof;
   at least about 10% by weight of water;

a thickener;

a surfactant; and a chelating agent;

the fluid having a viscosity of 15,000 cP or less at 20° C. and 0.06 sec$^{-1}$ shear rate;

the fluid meeting all requirements of SAE/AMS 1428 or its revisions for a non-Newtonian, Type II, III, or IV aircraft deicing/anti-icing fluid; and the fluid having a low aquatic toxicity as measured by an LC50 of at least 1,000 mg/L.

2. A fluid according to claim 1, wherein the fluid has a viscosity of 10,000 cP or less at 20° C. and 0.06 sec$^{-1}$ shear rate.

3. A fluid according to claim 1, wherein the fluid meets a WSET requirement of AMS 1428 for Type IV fluids.

4. A fluid according to claim 1, wherein a viscosity of the fluid at −5° C. and 0.06 sec$^{-1}$ shear rate is 3 to 10 times higher than a viscosity of the fluid at 20° C. and 0.06 sec$^{-1}$ shear rate.

5. A fluid according to claim 1, wherein a viscosity of the fluid at 0.06 sec$^{-1}$ shear rate begins to decline after cooling below −5° C.

6. A fluid according to claim 1, wherein the fluid includes an inorganic base.

7. A fluid according to claim 1, wherein the fluid includes a thinner that decreases the viscosity of the fluid at 20° C. and 0.06 sec$^{-1}$ shear rate.

8. A fluid according to claim 7, wherein the thinner is a sodium carboxylate or a potassium carboxylate.

9. A fluid according to claim 1, wherein the fluid has a gel forming potential of no more than 2.5 as measured according to AMS 1428.

10. A fluid according to claim 1, wherein the freeze point depressant comprises propylene glycol.

11. A fluid according to claim 1, further comprising a corrosion inhibitor.

12. A fluid according to claim 11, wherein the corrosion inhibitor is selected from the group consisting of carboxylates, phosphonates, sulfonates, amines, silicates, amides, and mixtures thereof.

13. A fluid according to claim 11, further comprising an anti-precipitant.

14. A fluid according to claim 1, further comprising an anti-foaming agent.

15. A non-toxic deicing/anti-icing fluid comprising:

at least about 20% by weight of a freeze point depressant selected from the group consisting of short chain polyols having 3 to 5 carbon atoms, and mixtures thereof;

at least about 10% by weight of water;

an associative thickener which is a cross-linked polycarboxylic acid;

an associative surfactant selected from the group consisting of alkoxylated branched alcohols and alkoxylated linear or secondary alcohols; and a chelating agent;

the fluid having a viscosity of 15,000 cP or less at 20° C. and 0.06 sec$^{-1}$ shear rate;

the fluid meeting all requirements of SAE/AMS 1428 or its revisions for a non-Newtonian, Type II, III, or IV aircraft deicing/anti-icing fluid; and the fluid having a low aquatic toxicity as measured by an LC50 of at least 1,000 mg/L.

16. A fluid according to claim 15, wherein the thickener is a cross-linked polyacrylic acid.

17. A fluid according to claim 15, wherein the thickener is a cross-linked polymer of acrylic acid and $C_{10}$-$C_{30}$ alkyl acrylate.

18. A fluid according to claim 15, wherein the fluid includes 0.20% or less thickener by weight of the fluid.

19. A fluid according to claim 15, wherein the fluid has a gel forming potential of no more than 2.5 as measured according to AMS 1428.

20. A fluid according to claim 15, wherein the surfactant is an alkoxylated branched alcohol.

21. A fluid according to claim 15, wherein the surfactant is an alcohol ethoxylate.

22. A fluid according to claim 21, wherein the surfactant is an alcohol ethoxylate having the structural formula $C_{n+1}H_{2n+3}(EO)_yH$ where n=6-18 and y=3-12.

23. A fluid according to claim 15, wherein the fluid meets a WSET requirement of AMS 1428 for Type IV fluids.

24. A fluid according to claim 15, wherein the fluid includes an inorganic base.

25. A fluid according to claim 15, wherein the fluid includes a thinner that decreases the viscosity of the fluid at 20° C. and 0.06 sec$^{-1}$ shear rate.

26. A fluid according to claim 15, wherein the freeze point depressant comprises propylene glycol.

27. A fluid according to claim 15, further comprising a corrosion inhibitor.

28. A fluid according to claim 27, wherein the corrosion inhibitor is selected from the group consisting of carboxylates, phosphonates, sulfonates, amines, silicates, amides, and mixtures thereof.

29. A fluid according to claim 27, further comprising an anti-precipitant.

30. A fluid according to claim 15, further comprising an anti-foaming agent.

31. A fluid according to claim 15, wherein the fluid has a viscosity of 10,000 cP or less at 20° C. and 0.06 sec$^{-1}$ shear rate.

32. A non-toxic deicing/anti-icing fluid comprising:

at least about 20% by weight of a freeze point depressant selected from the group consisting of short chain polyols having 3 to 5 carbon atoms, and mixtures thereof;

at least about 10% by weight of water;

a thickener;

a surfactant;

a chelating agent; and a thinner that decreases the viscosity of the fluid at 20° C. and 0.06 sec$^{-1}$ shear rate;

the fluid having a viscosity of 10,000 cP or less at 20° C. and 006 sec$^{-1}$ shear rate;

the fluid meeting all requirements of SAE/AMS 1428 or its revisions for a non-Newtonian, Type II, III, or IV aircraft deicing/anti-icing fluid; and the fluid having a low aquatic toxicity as measured by an LC50 of at least 1,000 mg/L.

* * * * *